(12) United States Patent
Loreskar et al.

(10) Patent No.: US 12,081,989 B2
(45) Date of Patent: Sep. 3, 2024

(54) AUTHENTICATION METHOD AND TERMINAL DEVICE

(71) Applicant: Trustonic Limited, Cambridge (GB)

(72) Inventors: Chris Loreskar, Cambridge (GB); Florent Joubert, Cambridge (GB)

(73) Assignee: Trustonic Limited, Cambridge (GB)

( * ) Notice: Subject to any disclaimer, the term of this patent is extended or adjusted under 35 U.S.C. 154(b) by 25 days.

(21) Appl. No.: 17/583,561

(22) Filed: Jan. 25, 2022

(65) Prior Publication Data

US 2022/0150707 A1 May 12, 2022

Related U.S. Application Data

(62) Division of application No. 16/816,723, filed on Mar. 12, 2020, now Pat. No. 11,533,625.

(30) Foreign Application Priority Data

Mar. 13, 2019 (GB) ..................................... 1903449

(51) Int. Cl.
*H04W 12/48* (2021.01)
*H04L 9/40* (2022.01)
(Continued)

(52) U.S. Cl.
CPC ......... *H04W 12/48* (2021.01); *H04L 63/0442* (2013.01); *H04L 63/104* (2013.01); *H04W 8/183* (2013.01); *H04W 12/037* (2021.01); *H04W 12/0431* (2021.01); *H04W 12/069* (2021.01); *H04W 12/12* (2013.01)

(58) Field of Classification Search
CPC ............. H04L 63/0442; H04L 63/0853; H04L 63/0876; H04L 63/104; H04L 63/08; H04L 9/32; H04L 9/3234; H04W 12/037; H04W 12/0431; H04W 12/069; H04W 12/12; H04W 12/40; H04W 12/48; H04W 8/183; H04W 12/06; G06Q 20/40
See application file for complete search history.

(56) References Cited

U.S. PATENT DOCUMENTS

| 8,931,068 B2* | 1/2015 | Haynes | ................... G06F 21/44 713/186 |
| 9,025,769 B2* | 5/2015 | Choi | ..................... H04W 12/04 380/247 |

(Continued)

FOREIGN PATENT DOCUMENTS

WO  2017/134632  8/2017

OTHER PUBLICATIONS

U.S. Appl. No. 16/816,723, filed Mar. 12, 2020, Loreskar et al.
(Continued)

*Primary Examiner* — Sharon S Lynch
(74) *Attorney, Agent, or Firm* — NIXON & VANDERHYE P.C.

(57) ABSTRACT

An authentication method and terminal device obtain a device identifier associated with an electronic device and receive an Integrated Circuit Card Identifier (ICC ID) of a Subscriber Identity Module (SIM) of the electronic device. A group of IDs is cryptographically signed with a device key of the terminal device or a key derived from the device key. The group of IDs may comprise the device identifier and the ICC ID.

12 Claims, 5 Drawing Sheets

(51) Int. Cl.
*H04W 8/18* (2009.01)
*H04W 12/037* (2021.01)
*H04W 12/0431* (2021.01)
*H04W 12/069* (2021.01)
*H04W 12/12* (2021.01)

(56) References Cited

U.S. PATENT DOCUMENTS

| | | | | |
|---|---|---|---|---|
| 9,276,737 | B2* | 3/2016 | Peirce | H04L 9/0822 |
| 9,445,257 | B2* | 9/2016 | Jiang | H04W 12/04 |
| 9,473,647 | B2* | 10/2016 | Davis | H04M 3/42068 |
| 9,681,305 | B2* | 6/2017 | Colegate | G06Q 20/4016 |
| 9,788,189 | B2* | 10/2017 | Stein | H04L 63/0853 |
| 9,942,094 | B1* | 4/2018 | Kovacevic | H04W 12/35 |
| 10,136,305 | B2* | 11/2018 | Chastain | H04W 60/00 |
| 10,243,796 | B2* | 3/2019 | Kovacevic | H04L 41/082 |
| 10,304,044 | B2* | 5/2019 | Colegate | G06F 21/44 |
| 10,575,179 | B2* | 2/2020 | Unnerstall | G06F 21/44 |
| 10,785,638 | B2* | 9/2020 | Chastain | H04W 12/069 |
| 10,798,582 | B2* | 10/2020 | Unnerstall | G06Q 20/3224 |
| 11,272,354 | B2* | 3/2022 | Chastain | H04W 12/069 |
| 11,330,548 | B2* | 5/2022 | Chastain | H04W 12/04 |
| 11,758,404 | B2* | 9/2023 | Vagelos | H04W 12/35 455/411 |
| 2009/0305668 | A1* | 12/2009 | Ahn | H04W 12/12 455/410 |
| 2012/0300927 | A1* | 11/2012 | Choi | H04W 12/04 380/247 |
| 2013/0058470 | A1* | 3/2013 | Davis | H04M 3/42042 379/93.09 |
| 2014/0115673 | A1* | 4/2014 | Haynes | G06F 21/32 726/5 |
| 2014/0344153 | A1* | 11/2014 | Raj | G06Q 20/3821 705/44 |
| 2014/0372743 | A1* | 12/2014 | Rogers | H04L 9/088 713/155 |
| 2014/0373184 | A1* | 12/2014 | Mahaffey | G06F 21/88 726/35 |
| 2015/0004967 | A1* | 1/2015 | Jiang | H04W 76/10 455/433 |
| 2015/0373530 | A1* | 12/2015 | Stein | H04W 4/60 455/411 |
| 2016/0080944 | A1* | 3/2016 | Colegate | H04L 63/06 455/410 |
| 2016/0165435 | A1* | 6/2016 | Mu | H04W 12/06 713/169 |
| 2016/0253651 | A1* | 9/2016 | Park | G06Q 20/34 705/39 |
| 2017/0270509 | A1* | 9/2017 | Colegate | H04L 63/061 |
| 2018/0152845 | A1* | 5/2018 | Unnerstall | G06Q 20/3224 |
| 2018/0160288 | A1* | 6/2018 | Chastain | H04W 8/04 |
| 2018/0160292 | A1* | 6/2018 | Chastain | H04W 4/50 |
| 2018/0160385 | A1* | 6/2018 | Chastain | H04W 8/04 |
| 2018/0160387 | A1* | 6/2018 | Chastain | H04W 8/26 |
| 2018/0191560 | A1* | 7/2018 | Kovacevic | H04W 12/35 |
| 2018/0225671 | A1* | 8/2018 | Brown | H04L 63/0861 |
| 2018/0316671 | A1* | 11/2018 | Brown | H04L 63/0884 |
| 2019/0045353 | A1* | 2/2019 | Chastain | H04W 60/00 |
| 2019/0373471 | A1* | 12/2019 | Li | H04W 12/069 |
| 2020/0162923 | A1* | 5/2020 | Unnerstall | H04W 4/02 |
| 2020/0382943 | A1* | 12/2020 | Chastain | H04W 12/069 |
| 2021/0168610 | A1* | 6/2021 | Adrangi | H04W 12/069 |
| 2022/0159452 | A1* | 5/2022 | Chastain | H04W 12/06 |

OTHER PUBLICATIONS

Combined Search and Examination Report for GB Application No. 1903449.5 dated Sep. 2, 2019, 5 pages.

Office Action dated Mar. 2, 2022 for U.S. Appl. No. 16/816,723, 16 pages.

Notice of Allowance dated Sep. 6, 2022 for U.S. Appl. No. 16/816,723, 13 pages.

* cited by examiner

AUTHENTICATION METHOD AND TERMINAL DEVICE

CROSS-REFERENCE

This application is a divisional of U.S. application Ser. No. 16/816,723, filed Mar. 12, 2020, 2019, which claims priority to GB Patent Application No. 1903449.5 filed Mar. 13, 2019, the entire contents of each of which are hereby incorporated by reference.

FIELD AND BACKGROUND

The present techniques relate to the field of computing devices. More particularly, they relate to determining the authenticity of a request.

A computing device may be vulnerable to hackers intending to spoof the identities of a computing device in an attempt to utilise rights that should be reserved for authorised users of the computing device. In doing so, hackers may attempt to replicate or impersonate the identifiers (IDs) used to represent the identity of a device. Prevention of such attacks currently rely on requesting IDs that are often difficult to obtain or replicate as a result of limited use of said IDs in scenarios other than the execution of specific rights. For example, the International Mobile Subscriber Identity (IMSI) of a device is not broadcast regularly so as to prevent hackers identifying the SIM card from which the IMSI originates. Rather a Temporary Mobile Subscriber Identity (TMSI) may be used instead.

In particular, SIM swapping fraud is becoming a greater problem, for both the users involved and the mobile network operators (MNOs).

SIM swapping fraud relates to attacking the second form of authentication that is predominately used by various websites, banks and other service providers for logging in. For example, in addition to a first factor of authentication, e.g. based on information provided through a web-based form, the authentication could also be based on a second factor, e.g. by responding to a message (or confirming a code) sent to the device having the SIM associated with the account. By using social engineering or other techniques, attackers may successfully obtain a second SIM card and can thus fraudulently receive information intended for the original SIM card. This may be utilised, for example, in a situation wherein hackers have obtained access to a user's first level of authentication in order to make use of the second level of authentication.

As a result of this, hackers can forcibly access or take accounts, steal resources (such as bitcoin) and so on. It also renders the 2nd form of authentication as a weak or even broken method of authentication. Therefore, such hacking may have serious consequences when exploited. Liability may fall on the MNOs who are responsible for the issuance of the second SIM. Therefore there is a need to mitigate against the actions of hackers and to increase the ability of end users to increase the overall security of their devices.

At least certain embodiments of the present disclosure address one of more of these problems as set out above.

SUMMARY

Particular aspects and embodiments are set out in the appended claims.

At least some examples provide a method, the method comprising: receiving at least one request for an action in relation to an electronic device, wherein performance of the action requires verification of an association of a group of IDs specified by the request; verifying, via cryptographic verification, whether the group of IDs specified by the request match a cryptographically attested group of IDs associated with the electronic device, to determine whether the at least one request for an action is an authentic request; and, having determined the at least one request for an action is an authentic request, approving the at least one request, wherein the group of IDs comprises at least an Integrated Circuit Card Identifier (ICC ID) of a Subscriber Identity Module (SIM) of the electronic device and a device identifier associated with the electronic device.

In a first embodiment of the invention there is provided, a method comprising: receiving at least one request for an action in relation to an electronic device, wherein performance of the action requires verification of an association of a group of IDs specified by the request; verifying, via cryptographic verification, whether the group of IDs specified by the request match a cryptographically attested group of IDs associated with the electronic device, to determine whether the at least one request for an action is an authentic request; and, having determined the at least one request for an action is an authentic request, approving the at least one request, wherein the group of IDs comprises at least an Integrated Circuit Card Identifier (ICC ID) of a Subscriber Identity Module (SIM) of the electronic device and a device identifier associated with the electronic device.

In an example, verifying whether the at least one request for an action is an authentic request comprises verifying by a public key associated with a private key of the electronic device.

In an example, the device identifier associated with the electronic device comprises at least one of: an identifier associated with a trusted execution environment (TEE) provided by the electronic device; an International Mobile Equipment Identity (IMEI); and, a media access control (MAC) address.

In an example, the group of IDs comprises at least one of the International Mobile Subscriber Identity (IMSI) and the Temporary Mobile Subscriber Identity (TMSI).

In an example, verifying whether the at least one request for an action is an authentic request comprises: looking up, in a database of associations, the group of IDs specified by the at least one request.

In an example, the action in the at least one request for an action comprises setting a user selected authentication step for use in an action with user selected data.

In an example, verifying whether said future requests are authentic requests further comprises: verifying the authenticity of a future request based on the user selected authentication step.

In a second embodiment of the invention there is provided a network device comprising processing circuitry configured to: receive at least one request for an action in relation to an electronic device, wherein performance of the action requires verification of an association of a group of IDs specified by the request; verify, via cryptographic verification, whether the group of IDs specified by the request match a cryptographically attested group of IDs associated with the electronic device, to determine whether the at least one request for an action is an authentic request; and, approve the at least one request, having determined the at least one request for an action is an authentic request, wherein the group of IDs comprises at least an Integrated Circuit Card Identifier (ICC ID) of a Subscriber Identity Module (SIM) of the electronic device and a device identifier associated with the electronic device.

In a third embodiment of the invention, there is provided a computer program for controlling a data processing apparatus to perform the above-described method.

In a fourth embodiment of the invention, there is provided a method comprising: obtaining a device identifier associated with an electronic device; receiving an Integrated Circuit Card Identifier (ICC ID) of a Subscriber Identity Module (SIM) of the electronic device; and, cryptographically signing a group of IDs with a device key of the electronic device or a key derived from the device key, wherein the group of IDs comprises the device identifier and the ICC ID.

In an example, the method further comprises: sending at least one request for an action in relation to the electronic device; and, sending a signed group of IDs with at least one request for an action.

In a fifth embodiment of the invention, there is provided a terminal device arranged to perform the above-described method.

In a sixth embodiment of the invention, there is provided a terminal device comprising processing circuitry configured to: obtain a device identifier associated with an electronic device; receive an Integrated Circuit Card Identifier (ICC ID) of a Subscriber Identity Module (SIM) of the electronic device; and, cryptographically sign a group of IDs with a device key of the electronic device, wherein the group of IDs comprises the device identifier and the ICC ID.]

In a seventh embodiment of the invention, there is provided a computer program for controlling a data processing apparatus to perform the above-described method.

Other aspects will also become apparent upon review of the present disclosure, in particular upon review of the Brief Description of the Drawings, Detailed Description and Claims sections.

BRIEF DESCRIPTION OF THE DRAWINGS

Further aspects, features and advantages of the present technique will be apparent from the following description of examples, which is to be read in conjunction with the accompanying drawings, in which.

Figure 1:
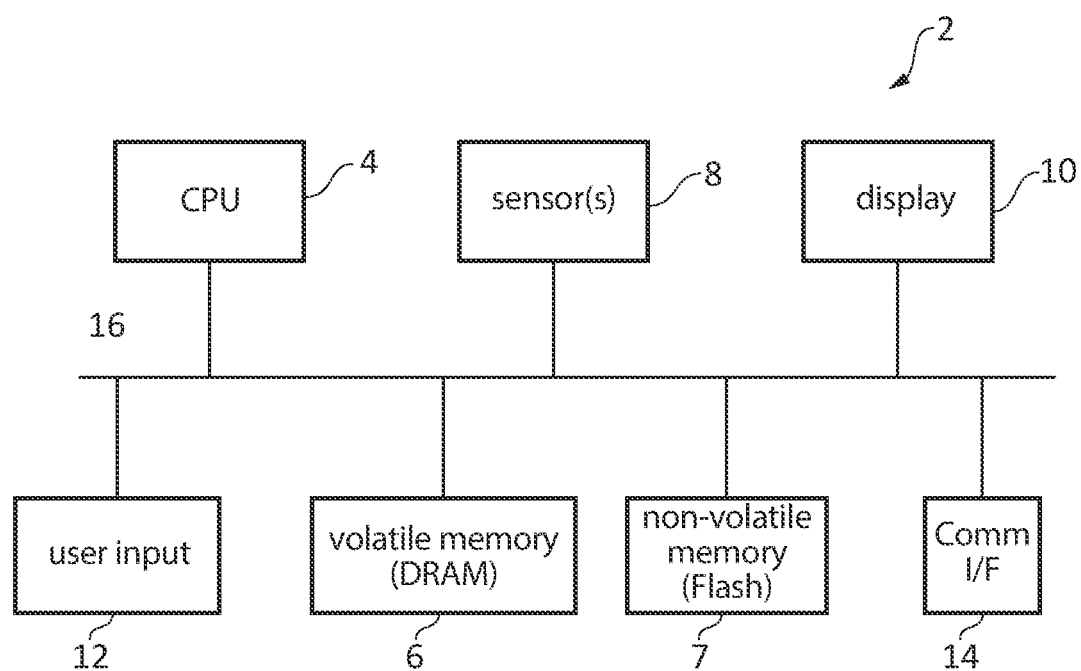
FIG. 1 schematically illustrates an example of a computing device.

While the disclosure is susceptible to various modifications and alternative forms, specific example approaches are shown by way of example in the drawings and are herein described in detail. It should be understood however that the drawings and detailed description attached hereto are not intended to limit the disclosure to the particular form disclosed but rather the disclosure is to cover all modifications, equivalents and alternatives falling within the spirit and scope of the claimed invention.

It will be recognised that the features of the above-described examples of the disclosure can conveniently and interchangeably be used in any suitable combination.

DETAILED DESCRIPTION

In a first embodiment of the invention there is provided, a method comprising: receiving at least one request for an action in relation to an electronic device, wherein performance of the action requires verification of an association of a group of IDs specified by the request; verifying, via cryptographic verification, whether the group of IDs specified by the request match a cryptographically attested group of IDs associated with the electronic device, to determine whether the at least one request for an action is an authentic request; and, having determined the at least one request for an action is an authentic request, approving the at least one request, wherein the group of IDs comprises at least an Integrated Circuit Card Identifier (ICC ID) of a Subscriber Identity Module (SIM) of the electronic device and a device identifier associated with the electronic device.

An advantage of the method is that the binding of the ICC ID with the device identifier leads to a bound group of IDs which is harder to replicate by a non-authentic device and SIM combination or a hacker. The ICC ID being specific to the SIM and not being recreated within a cloned SIM means the method disclosed herein is harder to break, improving the safety of a user's interactions with a device. By verifying requests based on the ICC ID, this can ensure that a request is authenticated as coming from the device having the originally issued SIM for which the ICC ID has been bound to the device identifier in a cryptographic binding, rather than a cloned version of the SIM which would have the same IMSI but different ICC ID.

In an example, verifying whether the at least one request for an action is an authentic request comprises verifying by a public key associated with a private key of the electronic device.

In this example, the safety of the method is further improved as the use of a private key which is not known outside the device itself, prevents hackers from accessing the data required to forge a group of IDs that may enable a request to be enacted.

In an example, the device identifier associated with the electronic device comprises at least one of: an identifier associated with a trusted execution environment (TEE) provided by the electronic device; an International Mobile Equipment Identity (IMEI); and, a media access control (MAC) address.

Hence, by binding the ICC ID to an identifier associated with the device (which could be the device's IMEI, an identifier associated with the TEE, or a MAC address of the device), this means authentication is based on a specific pairing of device and SIM instance, which improves security when approving requests issued to request an action in relation to the device The use of a TEE enables further protection to the method, as the trusted execution environment may provide measures for preventing code executed within the TEE, and data accessed by that code, from being accessible to less secure code executing outside the TEE. In some examples, the steps of generating the request and the associated group of IDs may be performed within the TEE. This further increases the safety of the method as a result of the increased difficulty potential hackers would have in compromising the secure system of the device in which the TEE is located. In embodiments where a TEE-related identifier, such as a system on chip (SoC) Unique Identifier, is used as the device identifier, this can improve security further because given the security protections provided in the hardware architecture to support the TEE, it can be difficult for untrusted code provided by the hacker to identify or fake the TEE-related identifier. The SoC Unique Identifier is part of the SoC itself, as opposed to an IMEI which may be changed. Hence, this makes it harder for an attacker to impersonate a legitimate device.

In an example, the group of IDs comprises at least one of the International Mobile Subscriber Identity (IMSI) and the Temporary Mobile Subscriber Identity (TMSI), in addition to the ICC ID and device identifier. In an example, encryption may be used so as to not reveal the IMSI when the IMSI data is being sent or received. This encryption may increase the privacy of sending of information. The system described herein may utilise a secure channel between the TEE and a secure element for communicating the TMSI, so as to increase the difficulty to hack for a potential hacker.

Further inclusion of IDs in the group of IDs to be authenticated increases the difficulty for a potential hacker to break the protection provided by this method. If the hacker has to clone or obtain further IDs, the process of doing so is made more difficult and therefore less likely to succeed. This in turn improves the safety of the disclosed method. Also, inclusion of the IMSI in the bound group of IDs can be useful for correlating the ID bindings with information from other databases which may record information against the IMSI of the SIM.

In an example, verifying whether the at least one request for an action is an authentic request comprises: looking up, in a database of associations, the group of IDs specified by the at least one request.

By storing the group of IDs in the database of associations, the device need not supply the bound group of IDs for each request.

In an example, the action in the at least one request for an action comprises setting a user selected authentication step for use in an action with user selected data.

For example, the user selected authentication step could be a password, PIN code, mnemonic, answer to a security question, or other user-selected information which can then later be queried when the user attempts to request some action in relation to their account, or a request to use a remote service at some time in the future. By requiring a group of IDs including the ICC ID to be verified in order for the request to set the user-selected authentication step to be accepted, this ties the defined user-selected authentication step to the user of the device having the originally issued SIM which has the specified ICC ID, rather than a potentially malicious user of a device having the cloned SIM. Hence, when the user subsequently makes further requests for actions (not necessarily needing the ICC ID to be verified), this can be based on the user-selected authentication step, such as a password, PIN code etc., with added confidence that this authentication step was set by the legitimate user. In an example, the password or PIN code etc. that is registered at this stage could be the same as or different to the password or PIN code etc. that is used to log into the device.

In an example, verifying whether said future requests are authentic requests further comprises: verifying the authenticity of a future request based on the user selected authentication step.

Use of the user selected authentication step to verify future requests, means that there is no need to send the bound group of IDs during each request. This therefore reduces the traffic of a request and therefore decreases the computing power required to resolve a request. Also, use of the user-selected authentication step on future requests means that even if the SIM is subsequently lost by the legitimate user, they have a way of authenticating themselves to the other party which does not rely on the ICC ID, but as the user-selected authentication step has itself been verified based on the ICC ID, there is still confidence that the request comes from the legitimate user who had the device associated with the original SIM rather than a cloned SIM.

In a second embodiment of the invention there is provided a network device comprising processing circuitry configured to: receive at least one request for an action in relation to an electronic device, wherein performance of the action requires verification of an association of a group of IDs specified by the request; verify, via cryptographic verification, whether the group of IDs specified by the request match a cryptographically attested group of IDs associated with the electronic device, to determine whether the at least one request for an action is an authentic request; and, approve the at least one request, having determined the at least one request for an action is an authentic request, wherein the group of IDs comprises at least an Integrated Circuit Card Identifier (ICC ID) of a Subscriber Identity Module (SIM) card of the electronic device and a device identifier associated with the electronic device.

An advantage of the above configured device is that the binding of the ICC ID with the device identifier leads to a bound group of IDs which is hard to replicate by a non-authentic device and SIM combination or a hacker. The ICC ID being specific to the SIM and not being recreated within a cloned SIM means the above configured device disclosed herein is harder to break, improving the safety of a user's interactions with the device.

In a third embodiment of the invention, there is provided a computer program for controlling a data processing apparatus to perform the above-described method.

Advantages mentioned above apply for this computer program.

In a fourth embodiment of the invention, there is provided a method comprising: obtaining a device identifier associated with an electronic device; receiving an Integrated Circuit Card Identifier (ICC ID) of a Subscriber Identity Module (SIM) of the electronic device; and, cryptographically signing a group of IDs with a device key of the electronic device or a key derived from the device key, wherein the group of IDs comprises the device identifier and the ICC ID.

An advantage of the method is that the signing of the ICC ID with the device identifier leads to a bound group of IDs which is hard to replicate by a non-authentic device and SIM combination or a hacker. The ICC ID being specific to the SIM and not being recreated within a cloned SIM means the method disclosed herein is harder to break, improving the safety of a user's interactions with a device. ICC ID has sufficient number of bits that it cannot be trivially guessed.

In an example, the method further comprises: sending at least one request for an action in relation to the electronic device; and, sending a signed group of IDs with at least one request for an action.

Hence, in this case the device may retain its cryptographically signed group of IDs in local storage on the device itself (e.g. within secure memory protected by the TEE against access by untrusted code executed outside the TEE), or may be stored in a protected form (e.g. encrypted) in less secure memory of the device or a remote location. In this case, there is no need to maintain a central database of groups of IDs for respective devices. Instead, when the device issues a request for action, the request may be accompanied by the cryptographically bound group of IDs, which the receiving party can use to verify whether the request is authentic.

In an example, the method further comprises: sending the signed group of IDs to a database during a registration phase.

By storing the group of IDs in the database of associations, the device need not supply the bound group of IDs for each request. Instead, the signed group of IDs can be pre-registered in the database, and then at the time of the request, those IDs to be checked against the database can be provided. For example, the database can be maintained on a remote server which can be queried by a range of service providers, or could be maintained on a server specific to one particular service provider such as a banking provider or mobile network operator.

In a fifth embodiment of the invention, there is provided a terminal device arranged to perform the above-described method.

Advantages mentioned above apply for this computer device.

In a sixth embodiment of the invention, there is provided a terminal device comprising processing circuitry configured to: obtain a device identifier associated with an electronic device; receive an Integrated Circuit Card Identifier (ICC ID) of a Subscriber Identity Module (SIM) card of the electronic device; and, cryptographically sign a group of IDs with a device key of the electronic device, wherein the group of IDs comprises the device identifier and the ICC ID.]

An advantage of the above configured device is that the signing of the ICC ID with the device identifier leads to a bound group of IDs which is hard to replicate by a non-authentic device and SIM combination or a hacker. The ICC ID being specific to the SIM and not being recreated within a cloned SIM means the above configured device is harder to break, improving the safety of a user's interactions with a device.

In a seventh embodiment of the invention, there is provided a computer program for controlling a data processing apparatus to perform the above-described method.

Advantages mentioned above apply for this computer program.

FIG. 1 schematically illustrates an example of a computing device 2, e.g. an electronic device. The computing device could be, for example, a mobile device, a mobile telephone or tablet computer, a laptop or other processing device, or a smaller-scale device such as a smart watch, personal fitness/health tracker, or other devices in the Internet of Things, such as a temperature sensor within a heating or air conditioning system, an actuator for controlling street lighting, etc. It will be appreciated that these are just some examples of possible uses of the computing device.

The computing device 2 has processing circuitry (e.g. a central processing unit, CPU) 4 and storage circuitry (memory) 6, 7 for storing data and program code executed by the processing circuitry 4. In this example the memory includes volatile memory (e.g. DRAM) 6 and non-volatile memory (e.g. flash memory) 7. The device may also have one or more sensors 8 for sensing external conditions such as temperature, pressure, infrared radiation, etc., a display 10 for displaying information to a user, a user input module 12 for accepting input gestures from a user, and a communications interface 14 for communicating with other devices, for example through wireless protocols such as Wi-Fi, Bluetooth, or NFC or through wired communication such as Ethernet. The various components 4-14 of the device 2 communicate via at least one bus 16. It will be appreciated that FIG. 1 is just one example of a possible configuration of the device 2 and other examples may have many other components not shown in FIG. 1. Also not all of the components shown in FIG. 1 need to be included. For example some devices may not need any sensors 8 or if they do not interact directly with a user may not need a display 10 and/or user input 12.

Figure 2:
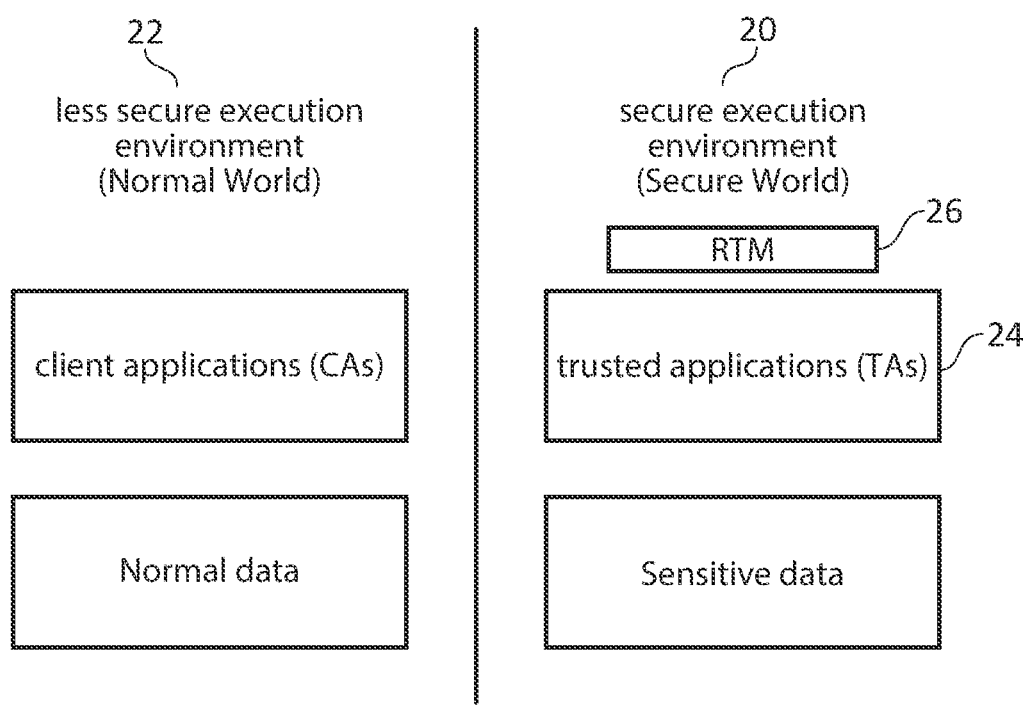
FIG. 2 illustrates a secure execution environment and a less secure execution environment.

As shown in FIG. 2, the processing circuitry 4 and other components of the device may have a hardware architecture which provides for a secure execution environment 20 and a less secure (normal) execution environment 22 which coexist on the device. Software applications and data may be associated with one of the secure or less secure execution environments, and application code or data associated with the secure execution environment 20 is isolated from access by the code executed within the less secure execution environment 22. This may be implemented using hardware architecture features, such as using a memory management unit which may define a partition of memory address space into secure and less secure regions, and may enforce memory protection so that access requests issued by an application executed in the less secure execution environment 22 are not permitted to read/write a region of the memory address space that is restricted for access by the secure execution environment 20. In some examples, only the volatile memory unit 6 may be partitioned into the secure and less secure regions and have its access policed by the memory management unit. In such examples the non-volatile memory 7 may be considered entirely associated with the less secure execution environment. Alternatively, other approaches may also partition the non-volatile memory 7 into secure and less secure regions and prevent less secure code accessing data stored in the secure region in the non-volatile memory. Other security mechanisms that can be provided to protect the assets associated with a secure environment 20 may be to provide for encryption of any data which may need to be paged out of the secure regions of memory to a potentially insecure location such as an external device (or in the flash memory 7 if this is not within the secure boundary of the secure execution environment 20). The secure execution environment 20 may be a trusted execution environment (TEE). The isolation of the secure execution environment 20 from the less secure execution environment 22 could in some examples be controlled according to the TrustZone® architecture provided by Arm® Limited of Cambridge, UK. Other architectures for providing TEEs are also known.

To further protect the information passed from the device, the SIM may emit to the TEE a group of IDs which are already pre-bundled and which cannot be read by the TEE. The TEE may add to the pre-bundled group of IDs the IMEI and/or the SUID or the like, before protecting the group of IDs. In this way the TEE operates merely to forward the pre-bundled group of IDs onwards to the network. The network may then un-bundle the group of IDs and the IMEI and/or SUID to obtain the individual components of the group of IDs. In this example, the SIM may run an applet or the like to create the pre-bundled group of IDs that cannot be un-bundled by the TEE prior to transmission to the network.

A secure operating system running within the secure execution environment 20 may control the execution of trusted applications (TAs) 24 within the secure execution environment 20. The secure operating system may include a runtime manager 26 which may act as a control software component for handling certain tasks such as encryption/decryption and TA scheduling.

Figure 3:
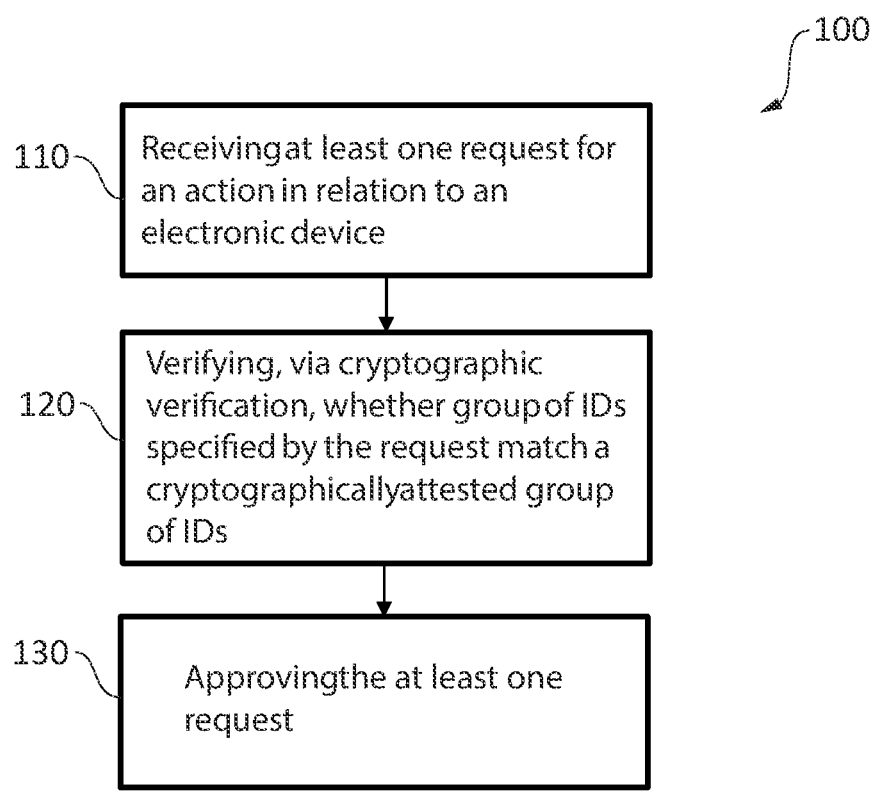
FIG. 3 schematically illustrates an example method according to teachings of the disclosure for approving an authentic request from a computing device.

FIG. 3 shows a schematic illustration of an example method 100 according to teachings of the disclosure for approving an authentic request from a computing device.

At step 110, a request for an action is received in relation to an electronic device. The request for an action may be any of a request for issuance of a Subscriber Identity Module SIM (which may be a second or subsequent SIM) or a request for making a payment. The action may be an action that would, in typical circumstances, require authentication of some sort of the identity of the requester. The authentication may occur against a carrier, which subsequently uses the authentication to enable requests within e.g. terms of service of said carrier.

At step 120, a group of identifiers (IDs) specified by the request is verified, via cryptographic verification, against a cryptographically attested group of IDs. For example, the group of IDs may be checked against a cryptographically signed group of IDs, where the authenticity of the cryptographically signed group can be checked based on a known public key corresponding to the private key of the party who signed the group of IDs. The group of IDs may include at least an Integrated Circuit Card Identifier (ICC ID) of a Subscriber Identity Module (SIM) of the electronic device and a device identifier associated with the electronic device. This verification step enables the receiver of the request to check that the request is authentic, and by this it is meant that the request stems from the user of the electronic device or from the electronic device itself. The electronic device may be a mobile device.

The term "SIM" will be used herein throughout to refer to a collection of items which contain or store securely details related to an electronic device. In particular, the term SIM may refer to a piece of hardware, a SIM card, or a software equivalent such as an eSIM, a virtual SIM, an iSIM, a (U)SIM, or a CSIM.

At step 130, subsequent to the verification step, and provided the verification step has determined that the at least one request is an authentic request, the at least one request is approved. This may result in, for example, the setting of a user-defined authentication step (e.g. setting a password or PIN code or answer to a security-related question), issuance of a second SIM (or profile in the case of an eSIM) or the releasing of resources for making a payment or the like.

Although not shown in FIG. 3, if the verification leads to a determination that the at least one request for an action is not an authentic request, the at least one request is not approved. As such, it is shown that the method of FIG. 3 enables authentic and non-authentic requests (which may have originated from a hacker or the like) to be distinguished from one another and therefore protects the user of the electronic device.

The verification of the group of IDs in step 120 may take a number of forms. In an example, the trusted execution environment (TEE) of an electronic device is utilised alongside the binding of selected IDs related to the genuine user or genuine device so that an authentic request from the genuine user or genuine device may be allowed. The TA, as shown in FIG. 2, running inside the TEE is used to provide at least some of the IDs used to authenticate the device (as well as to create the cryptographic binding between IDs as discussed in more detail with respect to FIG. 5 below). In specific example, the International Mobile Equipment Identity (IMEI) is bound to the Set User ID (SUID) (which is an identifier associated with the specific instance of the TEE on the device) during device binding, and the IMEI and SUID is linked to the inserted SIM of the device, optionally alongside a Personal Identification Number (PIN) for additional security. With this arrangement, the group of IDs to be verified includes the IMEI in the device, the SUID of the device and the link to the SIM of the device. With this group, a request sent subsequent to the creation of the binding can be verified as being authentic so as to allow or prevent the request which may be, for example, for the delivery or production of a new SIM. Therefore, the device identifier may be the SUID or the IMEI or both. In some examples, a MAC could also be used as the device identifier.

Other identities that may be used include Integrated Circuit Card Identifier (ICC ID) of a SIM of the electronic device and a device identifier associated with the electronic device. In an example, the Mobile Station International Subscriber Directory Number (MSISDN) associated with the device may be used in the group of IDs to be verified.

The examples described herein have several advantages. By using the combination of bound information to verify the request as being an authentic request, the safety of a user's device is maintained. This in turn reduces the likelihood of a successful hack attempt. As such, a user is less likely to be negatively affected by unauthentic or forged requests as these are more likely to be identified as such during the verification stages of the examples described herein.

The binding that is created in the method described herein comprises the ICC ID of the SIM. That the ICC ID is specific for each SIM (and different across cloned SIMs) means that a hacker is effectively prevented from impersonating the user of the device as a cloned SIM will not have the required ICC ID to successfully overcome the authentication. Therefore, the binding produced can only be verifiably utilised by the original SIM and not for any cloned SIM.

In an example, verifying whether the at least one request for an action is an authentic request comprises verifying by a public key associated with a private key of the electronic device. The MNO may have the public key in its possession or it may collect the public key from a certificate server associated with the electronic device. The MNO may then cache the key so that it need not collect it in subsequent communications with the same electronic device. The MNO may send a request to obtain the device's certificate and to obtain the public key for use in the verification process. In another example, the certificate may be part of the request removing the need to obtain the device's certificate.

Figure 4:
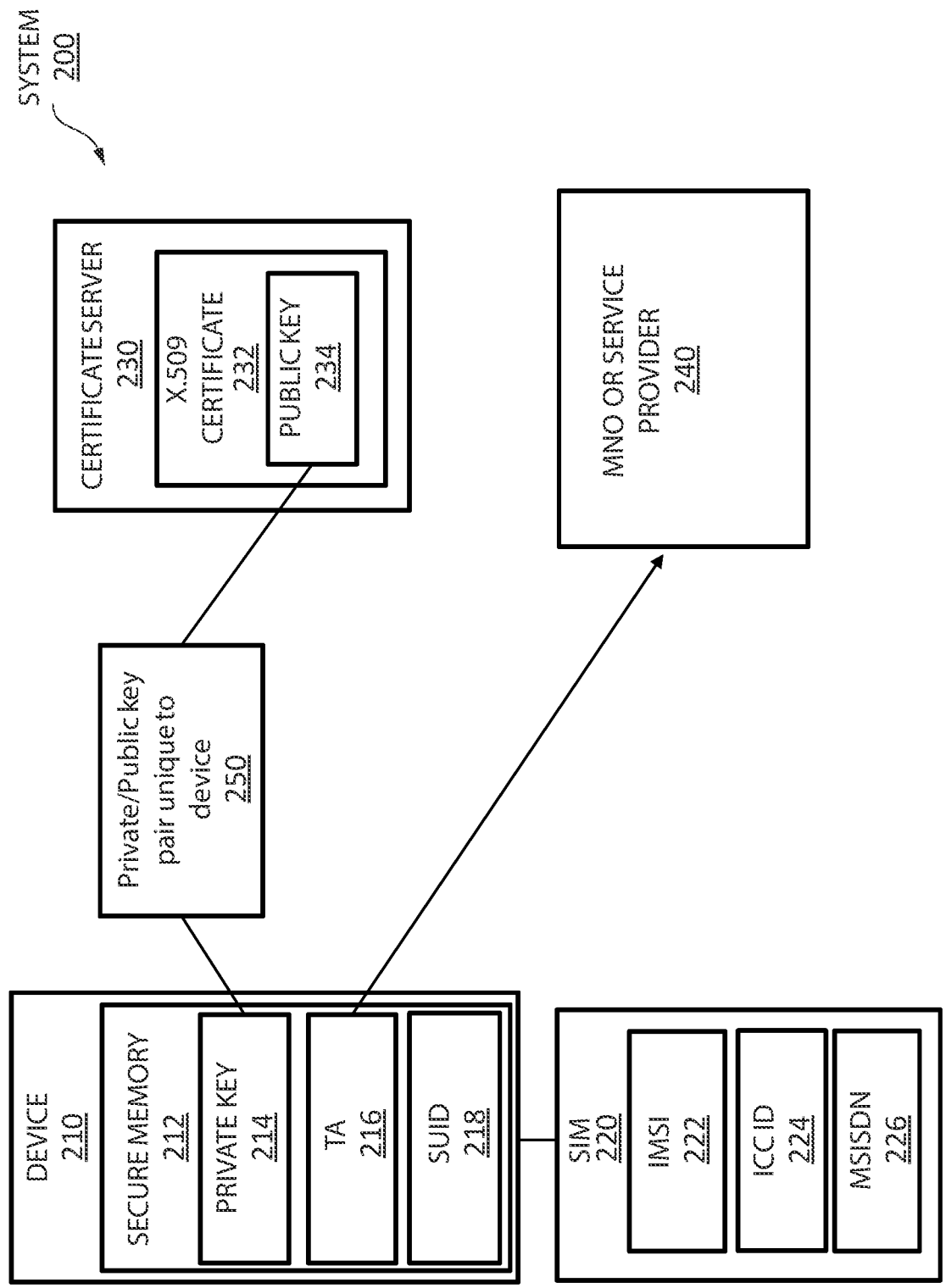
FIG. 4 schematically illustrates an example of a system which can be used to implement teachings of the disclosure.

FIG. 4 schematically illustrates an example of a system 200 which can be used to implement teachings of the disclosure.

The system 200 as shown in the example of FIG. 4 has a device 210, a SIM 220, a certificate server 230 and an MNO 240. In this example, the SIM 220 is shown as a SIM card separate from the device itself, but in other embodiments the SIM 220 could be dedicated hardware module of the device 210, or could be implemented as an eSIM or virtual SIM (or others listed above) using software on the device.

The device 210 of FIG. 4 has a secure memory 212 portion (corresponding to the region of memory protected by the secure execution environment 20 of the TEE) which holds a private key 214, a TA 216 and an SUID 218. The SIM 220 associated with the device 210 has three identifiers including an IMSI 222, an ICC ID 224 and an MSISDN 226. The ICC ID 224, as mentioned above, is specific to the specific SIM instance 220. The certificate server 230 in the example shown in FIG. 4 of the system 200 has an X.509 certificate 232 which holds a public key 234, which can be used to authenticate signed messages generated using the private key 214. The certificate server 230 may have any suitable certificate which may hold a public key 234. The certificate 232 need not be an X.509 certificate but any other kind of certificate, e.g. a proprietary solution that is not X.509.

In use, the system 200 of the example shown in FIG. 4 may operate as follows. During manufacture, the device 210 is programmed with a series of identifiers which may be securely stored. In an example, the device 210 is programmed with a unique IMEI (not shown in FIG. 4). A certificate 232 may be created which includes such a series of identifiers, e.g. the IMEI and SUID 218. The certificate 232 may be stored in a publicly facing web server 230. The certificate 232 may be an X.509 certificate. The certificate 232 may be accessible by e.g. a network or service provider or the like.

In an example, the public key 234 and private key 214 of the above example may be a set of symmetric keys.

The SIM 220 associated with the device 210 has an IMSI 222, an ICC ID 223 and an MSISDN 226 amongst other identifiers. A cloned SIM may have the same IMSI and MSISDN but will have a different ICC ID to the original SIM 220. As such, in the system 200 of FIG. 4, the original SIM 220 and a cloned SIM may be differentiated by virtue of the differing ICC IDs. Therefore, when authenticating IDs, the ICC ID of a cloned SIM would fail authentication of a bound group of IDs containing the ICC ID of the original SIM.

When the device 210 powers on for the first time with a newly inserted SIM 220 for which no previous ID pairing has been established, a pairing is required. In a device 210 with multiple active SIMs 220 (dual SIM dual standby, dual SIM dual call for example) the process might repeat for each subscriber identity as required.

ATA 216 running in a secure memory 212 portion, protected by the TEE 20, of the device 210 takes the reported IMSI 222 (and/or the IMEI not shown in FIG. 4) associated with the device 210 as well as the ICC ID 224 and pairs it with the SUID 218 and signs the group of IDs using a Root of Trust (RoT) (the private key 214) of the device 210 which was injected at the initial factory. In an example, the group of IDs is signed using a device key.

This method therefore produces a cryptographic binding between the IMSI 222 and/or the IMEI, the ICC ID 224 and the SUID 218. This bound group of IDs may be stored in the device or sent to a server and stored there in a database of bindings.

This group of IDs binds identifiers of the device 210 to identifiers of the SIM 220 such that subsequent requests for actions may be authenticated against the binding. As mentioned above, the binding prevents cloned SIMs from being authenticated via the presence of the ICC ID 224 in the bound group of IDs.

The TA 216 may keep the binding on the device 210 for later authentication. Alternatively, the TA 216 may send this binding to any server which may be run by the MNO or service provider 240, or upload the binding to a certificate server 230. When a request for action occurs (which need not be immediate or temporally close to the creation of the binding), the group of IDs may be verified against the binding. This binding may be on the device 210 or on a server, e.g. that of the MNO 240. As such, the supplied group of IDs with the request may be checked against the binding on the device 210 or against the binding on the server.

The IMEI may be excluded from the signing process and the SUID could be solely used instead. This would also achieve a goal of the present invention as the IMEI may already be known by examining the device certificate 232 and so therefore the certificate could be used instead. Secondly, as the IMEI is already presented to the network as part of the attachment request, the network can extract this information and compare it to the certificate 232 and thus the IMEI is not needed.

The binding of the IMSI 222 and an identifier of the device 210, e.g. the IMEI, binds the SIM 220 to the device 210. Binding the ICC ID 224 to the device 210 however binds a specific SIM 220 to the device 210 which improves the security of the system 200, as mentioned in detail above. Further coupling to the SUID 218 prevents a hacker attempting to hack the system 200 using a changing IMEI. Fraudulent impersonation of the legitimate device 210 by a hacker is then very difficult. The hacker would need to know the IMSI 222, ICC ID 224, the IMEI and the SUID 218 for an attack to succeed. As mentioned above, the use of a cloned SIM would not be sufficient for a hacker to overcome the disclosed method.

The method disclosed herein is, therefore, extremely difficult for a hacker to manipulate to force the enacting of unauthentic requests.

As mentioned above, when initial binding of the group of IDs takes place, the user may optionally select a further authentication step. This may be any of a phrase, password, PIN or other step which the user must sign and must be verified prior to enactment of a request. If the further step is not verified, but the group of IDs are, the request will be deemed as not authentic and will not be enacted. In an example, a hacker failing the further authentication step cannot obtain a second SIM or make a payment. This places a further level of control, and therefore hack prevention, with the user. Alternatively, the further authentication step could be used in cases where the group of IDs cannot be verified (e.g. if the original SIM 220 has been lost), as a means of checking whether the user is the user associated with the original issued SIM 220.

The signed group of IDs, alongside any further authentication steps, may be verified alongside a nonce (which is provided by the MNO or service provider 240 for example) to verify a time-based criterion of the request. This may enable one to detect if the signed response is valid or outdated or to indicate a freshness of the request. Indeed, the binding of the group of IDs initially indicates that the device is the genuine device. At this point, the user of the device is deemed to be the authentic user. The user may then be asked whether they wish to include an additional optional authentication step. This may be a PIN or password or the like. The inclusion of this step is deemed to have been made by the authentic user and therefore ensures a further authentication that would need to be overcome by a hacker attempting to impersonate the authentic user.

An example of the lifecycle of the device may include the following series of steps (which do not necessarily need to be in this precise order):

Step one: The SIM is manufactured with specific IMSI, ICC ID and MSISDN.

Step two: The device is manufactured and the IMEI and SUID are bound via device certificates.

Step three: The device activates (powers on) with an associated SIM with which to bind.

Step four: The device attempts to camp on the MNO's network.

Step five: The user of the device initiates a process to bind the SIM to the device.

This step may be automated rather than user-initiated. This step may not occur prior to a request for an action being made. If the request occurs prior to the binding of the device and SIM identities, the MNO may require further steps to occur to validate the user accordingly. These may include validation of details regarding the device or details regarding the user.

Step six: The HLR (or similar) responds with a nonce to the device as a freshness indicator for a request for an action (which may be a request for a second SIM).

The nonce may be a new nonce or may be a nonce as was passed to the SIM for the initial network attachment authentication. In this example, a second nonce would not be required and thus the overall system execution is simplified.

Step seven: If the user has chosen a further authentication step, the user is requested to input the information at this stage. This information may be transcribed by the TA as so required.

Step eight: The device may take the combined group of IDs (nonce, IMSI, ICC ID, IMEI, SUID and optional cue) and signs this using the device key.

Step nine: The device emits the signed blob to the MNO.

Step ten: MNO verifies the signed blob (e.g. based on the public key 234 stored in the certificate server 230) and ensures the IMSI exists and that the ICC ID is the original one and thus the one to protect (this would be the first ICC ID/IMSI paired with the subscriber's account). The MNO then ensures that the IMEI matches what is in the device certificate. The MNO then ensures the SUID also matches (though this step may be omitted as the SUID would need to be correct if the signature matched). The MNO then extracts the nonce and compares it against that stored in the EIR/HLR. The MNO then extracts the optional cue and stores this as well for future processing.

After the steps of the example above are performed, the MNO server has a device coupling on record for a SIM and a device with an optional cue.

The above example provides for a secure system for preventing fraud via authenticating a group of IDs related to an electronic device.

The blob of the above example may be encrypted so as to further increase the difficulty associated with performing fraud on the system described herein.

In the event that a hacker attempts to contact the MNO in a request for a second SIM, the MNO may check the HLR/EIR for information about what device the SIM might currently be locked to. In this example, a series of steps may occur:

Step one: The MNO may ask the user to provide information relating to the current electronic device. This may include model, operator, version numbers or the like. The MNO may then establish a preliminary level of trust on submission of accurate details related to the electronic device. This step is optional in assessing the authenticity of a request.

Step two: When step one is successfully passed, or is omitted, the MNO may request information related to the optional user-selected authentication step. This may take the form of the user providing the type of information required in the authentication step or providing the actual information required for the authentication step. For example, in a first option, the user may inform the MNO that the user-selected step involves recognition of a pre-selected picture, or provision of a PIN or a password. In a second option, the user may select the pre-selected picture from a number of pictures, or provide the PIN or password.

Step three: Once the above steps are, or step is, completed, the MNO may send the original electronic device a request to approve for the issuance or provision of a second SIM. The electronic device should be connected (for example over a wireless connection or the like) so as to receive the push notification from the MNO. Alternatively, the information may be obtained via a pull notification from the device to the MNO. In an example, the MNO can detect if a device is connected to the network by examining the databases of the MNO and thus the push notification can be sent straight away if the electronic device is on the network. If the electronic device is not on the network, the push notification may be delayed for a period of time. This can prevent the push being sent when the electronic device is, for example, not active or powered on. The database here may be part of a server or the like and could belong to a number of parties such as the MNO or a third party. The database may hold a plurality of cryptographically signed certificates attesting to combinations of a plurality of identifiers including, in an example, the ICC ID and an identifier related to the electronic device.

Step four: Once the device receives the push notification, the MNO's app may provide an interactive display requesting the user to authenticate and approve a SIM delivery. In an example, the user may be requesting an initial SIM as the electronic device need not have a SIM in to access a wireless network connection. Alternatively, the user may be requesting a subsequent SIM or action the like of which has been mentioned above. The request may be authenticated by the user via Trusted UI (TUI) or authentication via biometrics, or other high security authentication methods such as password, PIN code, Voice recognition or the like. The optional user-selected cue may be used at this point (whether for a second time or the first time) to further authenticate the user as the authorised user.

In an example, if the device was not online or for some other reason the requirement for a SIM swap wasn't served by the subscriber, the MNO may instead call the subscriber and ask them in person. This does however imply the user is camping and that the SIM on file is active and inserted into the electronic device. Thus, this would suggest a SIM swap was not strictly required, albeit could be exercised as an additional factor of authentication by the MNO.

In an example, the MNO could issue an SMS message, or the like, to the electronic device. The TA could pick up on this message and construct an adequate response to sign off the request. This may occur without user input, thereby reducing the requirement on the user. This is a further option for the MNO to ensure an authenticate request is actioned.

Step five: After the above steps, or any combination thereof, are enacted, the user may approve the transfer or production of the SIM by replying in a suitable manner to the MNO.

Step six: The MNO may verify the approval of the user using the device certificate. As mentioned above, a nonce may be used to ensure the reply is fresh.

The provision of the second SIM in the above example, need not necessarily be for use with the electronic device on which the second SIM is ordered. This can be useful in the situation wherein the electronic device is lost between requesting and receiving the SIM. Alternatively, in the situation wherein the user has a second electronic device with which the user wishes to use the second SIM.

Figure 5:
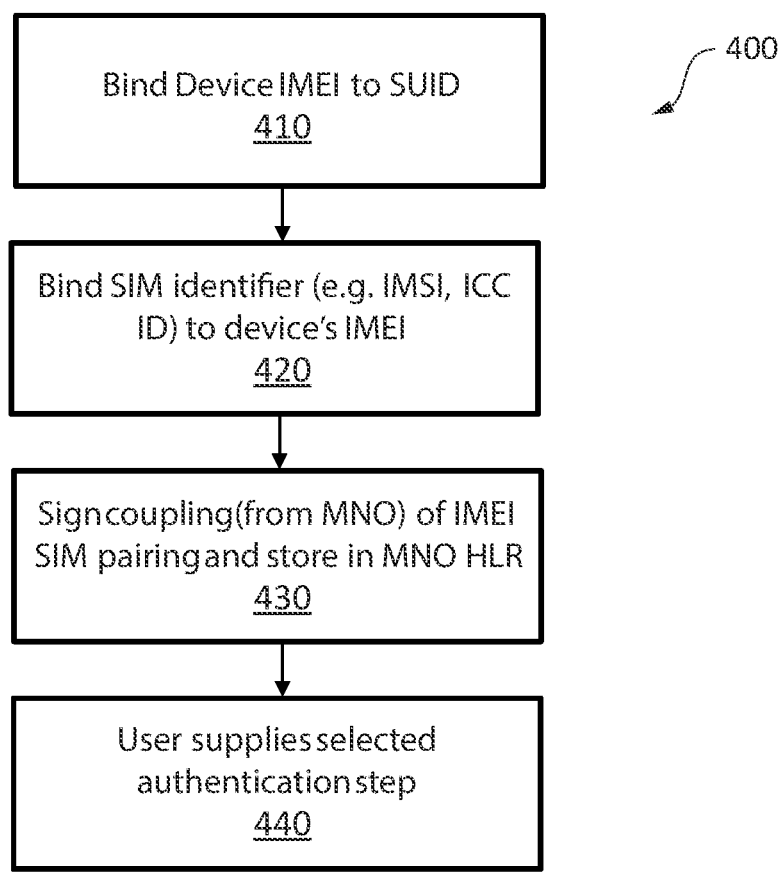
FIG. 5 schematically illustrates an example method according to teachings of the disclosure for approving an authentic request from a computing device.

FIG. 5 illustrates a specific example of a method 400 for binding a group of IDs for a device and for the user selection of a further authentication step. In FIG. 5, step 410 involves the binding of a device's IMEI to the SUID. In step 420, at least one SIM identifier is bound to the device's IMEI, this may be for example one or more of the IMSI and the ICC ID. This in effect locks together the device and the specific SIM in the group of IDs. In step 430, a coupling from the MNO of the IMEI/SIM identifier pairing is signed. This signature is stored in the MNO HLR. Such a group may, as described above, be stored in the device. In step 440, an optional step of the user supplying a further level of information for subsequent authentication is provided. This may be a password, a PIN code, or other user assigned code. Subsequent to a verification of the request being authentic, the request may be actioned. This method may occur on initial powering up of the device or during a registration phase.

The group of IDs are provided to the server in the manner described above. This is therefore a method which results in the creation of a bound group of IDs. A subsequent request for an action from a user, may involve using the bound group of IDs. The request may be sent and a verification of supplied data to the server can be performed to authenticate the request as originating from the authentic device and SIM pairing. Authentication of the user-supplied authentication step verifies the request as originating from the authentic user. In this way, that the request originated from the authentic user, authentic device and authentic SIM can be verified.

The method 400 reduces the likelihood of success of fraudulent requests for action by the authentication of a previously bound groups of IDs.

In any of the above described methods, the device identifier associated with the electronic device may be at least one of an identifier associated with a TEE provided by the electronic device, an IMEI and a Media Access Control (MAC) address.

In any of the above described methods, the group of IDs may comprise at least one of the IMSI and the TMSI.

The use of the TMSI in the above described system and methods is similar to the use of the IMSI but is not necessarily identical. The TMSI may be recorded against the relevant subscriber (or to which subscriber it applies) and the value may be stored in a HLR or Authentication Centre or the like. When the encrypted group of IDs is sent from the device, the TMSI may be included instead of the IMSI. The recordal of the subscriber to which the TMSI is relevant prevents a change in the TMSI from affecting the operation of the method.

In any of the above described methods, the identifier associated with the electronic device may be an identifier which is not tied to the device, but which is generated when secure software is first run on the device.

In any of the above described methods, when used to action the request for a second SIM, the second SIM to be provisioned may have a different PIN to the first SIM. The second SIM may have a number of different identifiers in comparison to the first SIM.

In any of the above described methods, the action in the request for an action may include allowing the electronic device to connect to a network. The network may be a specific network that is protected in some manner.

In any of the above described methods, the sending of the signed group of IDs to a database may occur during a registration phase. The registration phase may relate to registering the electronic device or registering the SIM or registering the device and the SIM together.

The methods discussed above may be performed under control of a computer program executing on a device. Hence a computer program may comprise instructions for controlling a device to perform any of the methods discussed above. The program can be stored on a computer-readable medium. A computer-readable medium may include non-transitory type media such as physical storage media including storage discs and solid state devices. A computer readable medium may also or alternatively include transient media such as carrier signals and transmission media. A computer-readable storage medium is defined herein as a non-transitory memory device. A memory device includes memory space within a single physical storage device or memory space spread across multiple physical storage devices.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative teachings of the disclosure have been described in detail herein with reference to the accompanying drawings, it is to be understood that the invention is not limited to those precise teachings, and that various changes and modifications can be effected therein by one skilled in the art without departing from the scope and spirit of the invention as defined by the appended claims.

The invention claimed is:

1. A method comprising:
  obtaining a device identifier associated with an electronic device;
  receiving an Integrated Circuit Card Identifier (ICC ID) of a Subscriber Identity Module (SIM) of the electronic device;
  cryptographically signing a group of IDs with a device key of the electronic device or a key derived from the device key, wherein the group of IDs comprises the device identifier and the ICC ID, wherein the device identifier comprises an identifier associated with a trusted execution environment (TEE) provided by the electronic device;
  generating, within the TEE, a request to perform an action in relation to the electronic device and sending the request with the signed group of IDs;
  wherein the device identifier associated with the electronic device comprises a media access control (MAC) address, and
  wherein the group of IDs comprises at least one of an International Mobile Subscriber Identity (IMSI) and a Temporary Mobile Subscriber Identity (TMSI).

2. A method according to claim 1, further comprising:
  sending a signed group of IDs with at least one request for an action.

3. A method according to claim 2, wherein the action in the at least one request for an action comprises setting a user selected authentication step for use in an action with user selected data.

4. A method according to claim 1, further comprising:
  sending the signed group of IDs to a database during a registration phase.

5. A method according to claim 1, wherein the device key is a private key.

6. A method according to claim 1, further comprising storing the cryptographically signed group of IDs within a secure memory protected by the TEE against access by untrusted code executed outside the TEE.

7. A terminal device comprising processing circuitry configured to:
  obtain a device identifier associated with an electronic device;

receive an Integrated Circuit Card Identifier (ICC ID) of a Subscriber Identity Module (SIM) of the electronic device;

cryptographically sign a group of IDs with a device key of the electronic device, wherein the group of IDs comprises the device identifier and the ICC ID, wherein the device identifier comprises an identifier associated with a trusted execution environment (TEE) provided by the electronic device;

generate, within the TEE, a request to perform an action in relation to the electronic device and sending the request with the signed group of IDs;

wherein the device identifier associated with the electronic device comprises a media access control (MAC) address, and wherein the group of IDs comprises at least one of an International Mobile Subscriber Identity (IMSI) and a Temporary Mobile Subscriber Identity (TMSI).

8. A terminal device according to claim 7, wherein the processing circuitry is configured to:

send a signed group of IDs with at least one request for an action.

9. A terminal device according to claim 8, wherein the action in the at least one request for an action comprises setting a user selected authentication step for use in an action with user selected data.

10. A terminal device according to claim 7, wherein the processing circuitry is configured to:

send the signed group of IDs to a database during a registration phase.

11. A terminal device according to claim 7, wherein the device key is a private key.

12. A terminal device according to claim 7, wherein the processing circuitry is configured to store the cryptographically signed group of IDs within a secure memory protected by the TEE against access by untrusted code executed outside the TEE.

* * * * *